United States Patent [19]
Grant

[11] Patent Number: 5,416,498
[45] Date of Patent: * May 16, 1995

[54] PREHENSILE POSITIONING COMPUTER KEYBOARD

[75] Inventor: Alan H. Grant, Chevy Chase, Md.

[73] Assignee: Ergonomics, Inc., Chevy Chase, Md.

[*] Notice: The portion of the term of this patent subsequent to Aug. 16, 2011 has been disclaimed.

[21] Appl. No.: 61,711

[22] Filed: May 17, 1993

Related U.S. Application Data

[63] Continuation-in-part of Ser. No. 939,618, Sep. 21, 1992, abandoned, which is a continuation-in-part of Ser. No. 846,710, Mar. 6, 1992, Pat. No. 5,339,097, which is a continuation-in-part of Ser. No. 328,234, Mar. 24, 1989, Pat. No. 5,119,078, which is a continuation-in-part of Ser. No. 33,039, Mar. 31, 1987, abandoned, which is a continuation-in-part of Ser. No. 921,616, Oct. 21, 1986, abandoned.

[51] Int. Cl.⁶ ............................................. G09G 3/02
[52] U.S. Cl. .................................... 345/168; 400/489
[58] Field of Search ............... 345/156, 157, 168, 167, 345/164; 341/20, 21, 22, 23; 248/917, 918, 920, 922; 400/486, 487, 489, 472, 91, 92, 195, 488; 235/144, 146; 364/709.14, 709.15; D14/107, 115

[56] References Cited

U.S. PATENT DOCUMENTS

D. 194,211 12/1962 Sanderson et al. .
D. 250,335 11/1978 Esslinger et al. .

(List continued on next page.)

FOREIGN PATENT DOCUMENTS

| | | |
|---|---|---|
| 998401 | 9/1951 | France . |
| 2607126 | 8/1977 | Germany . |
| 0332476 | 7/1930 | United Kingdom . |
| 2034043 | 5/1980 | United Kingdom . |
| 2122947 | 1/1984 | United Kingdom . |
| 2249053 | 4/1992 | United Kingdom . |
| 0806496 | 2/1981 | U.S.S.R. . |

OTHER PUBLICATIONS

Popular Science, What's New, p. 10, Sep. 1990.

Alan H. Grant, The Computer Syndrome, Journal of the American Optometric Association, vol. 58, No. 11, 11/87.
Alan H. Grant, Homo Quintadus and Computers, Optometry & Vision Science, vol. 67, No. 4, pp. 297–305.
IBM, Technical Disclosure Bulletin, Mapping the Computer 83-Keyboard to 62-Key Keyboard, vol. 27, No. 4B, Sep. 1984, pp. 2717 and 2718.
"Keyboard RSI: The Practical Solution", by Barbara Stack (1987) pp. 21–41.

(List continued on next page.)

*Primary Examiner*—Richard Hjerpe
*Assistant Examiner*—Chanh Nguyen
*Attorney, Agent, or Firm*—Jacobson, Price, Holman & Stern

[57] ABSTRACT

A computer keyboard is designed such that a user may acquire total tactile familiarity with the keyboard, thus enabling the user to copy written material and look at the screen while typing without looking at the keyboard. One embodiment of the keyboard of the invention is divided at its midpoint by a central peak and the outer portions slant downwardly and away from the central peak and upwardly away from the user to form a shallow V-shape. The V-shaped keyboard configuration lessens ulnar abducted deviation and permits a relatively straight hand-wrist orientation. The center-peak design also lessens the amount of hand pronation, i.e. the rotation of the hands from a comfortable vertical posture into an uncomfortable horizontal posture. Further, the V-shaped arrangement enables the forearms to be separated, allowing for unobstructed visual access to a copy-viewing area. Strain on the hands and wrists is minimized and occupationally-induced injuries, such as carpal tunnel syndrome, are avoided. The space bars are placed on the front edge of the keyboard surfaces and are activated by thumb pressure either vertically (conventionally), horizontally or at a selected angle. When the space bars are activated horizontally, the thumb moves in a natural grasping motion toward the forefinger.

27 Claims, 6 Drawing Sheets

U.S. PATENT DOCUMENTS

| | | |
|---|---|---|
| D. 268,677 | 4/1983 | Ohie et al. . |
| D. 270,347 | 8/1983 | Yomo et al. . |
| D. 316,541 | 4/1991 | Roberts . |
| D. 317,595 | 6/1991 | Yoshitake . |
| D. 318,287 | 7/1991 | Tsukamoto . |
| D. 323,817 | 2/1992 | Büchin . |
| D. 324,513 | 3/1992 | Sakaguchi et al. . |
| D. 346,816 | 5/1994 | Kline et al. . |
| D. 347,216 | 5/1994 | Ciccone . |
| 1,138,474 | 5/1915 | Heidner . |
| 3,698,532 | 10/1972 | Dodds . |
| 3,720,298 | 3/1973 | Abnas . |
| 3,990,565 | 11/1976 | Felton et al. . |
| 4,042,777 | 10/1978 | Bequaert et al. . |
| 4,244,659 | 1/1981 | Malt . |
| 4,294,555 | 10/1981 | Galaske et al. . |
| 4,313,122 | 1/1982 | Dupressoir et al. . |
| 4,402,624 | 9/1983 | Stahl et al. . |
| 4,421,035 | 12/1983 | Gubbe et al. . |
| 4,467,150 | 8/1984 | Leitermann et al. . |
| 4,483,634 | 11/1984 | Frey et al. . |
| 4,496,943 | 1/1985 | Greenblatt . |
| 4,504,055 | 3/1985 | Wells . |
| 4,509,873 | 4/1985 | Ryan . |
| 4,522,518 | 6/1985 | Schmidt . |
| 4,527,149 | 7/1985 | Swensen . |
| 4,545,554 | 10/1985 | Latino et al. . |
| 4,560,844 | 12/1985 | Takamura et al. . |
| 4,560,845 | 12/1985 | Takamura et al. . |
| 4,562,482 | 12/1985 | Brown . |
| 4,568,056 | 2/1986 | Lewinski . |
| 4,579,470 | 4/1986 | Casey . |
| 4,597,681 | 7/1986 | Hodges . |
| 4,635,893 | 1/1987 | Nelson . |
| 4,644,875 | 2/1987 | Watt . |
| 4,658,124 | 4/1987 | Bertina . |
| 4,661,005 | 4/1987 | Lahr . |
| 4,669,903 | 6/1987 | Herzog et al. . |
| 4,680,577 | 7/1987 | Straayer . |
| 4,693,444 | 9/1987 | Williams et al. . |
| 4,695,983 | 9/1987 | Oda et al. . |
| 4,712,101 | 12/1987 | Culver . |
| 4,724,715 | 2/1988 | Culver . |
| 4,735,394 | 4/1988 | Facco . |
| 4,735,520 | 4/1988 | Suzuki et al. . |
| 4,736,191 | 4/1988 | Matzke . |
| 4,760,217 | 7/1988 | Suzuki et al. . |
| 4,773,783 | 9/1988 | Dickie . |
| 4,775,255 | 10/1988 | Langberg . |
| 4,799,049 | 1/1989 | Avila . |
| 4,803,474 | 2/1989 | Kulp . |
| 4,823,294 | 4/1989 | Rouhani . |
| 4,823,634 | 4/1989 | Culver . |
| 4,824,268 | 4/1989 | Diernisse . |
| 4,835,528 | 5/1989 | Flinchbaugh . |
| 4,851,618 | 7/1989 | Amino et al. . |
| 4,856,748 | 8/1989 | Obermeyer . |
| 4,876,415 | 10/1989 | Clancy . |
| 4,891,777 | 1/1990 | Lapergre . |
| 4,896,554 | 1/1990 | Culver . |
| 4,923,093 | 5/1990 | Rahman . |
| 4,937,564 | 6/1990 | Oberg . |
| 4,974,183 | 11/1990 | Miller . |
| 4,982,618 | 1/1991 | Culver . |
| 5,004,196 | 4/1991 | Gross . |
| 5,021,771 | 6/1991 | Lachman . |
| 5,050,826 | 9/1991 | Johnston . |
| 5,056,743 | 10/1991 | Zwar et al. . |
| 5,059,048 | 10/1991 | Sirkin . |
| 5,067,834 | 11/1991 | Szmanda et al. . |
| 5,072,905 | 12/1991 | Hyatt . |
| 5,073,050 | 12/1991 | Andrews . |
| 5,115,231 | 5/1992 | Avila et al. . |
| 5,119,078 | 6/1992 | Grant . |
| 5,122,786 | 6/1992 | Rader . |
| 5,126,723 | 6/1992 | Long et al. . |
| 5,129,747 | 7/1992 | Hutchison . |
| 5,145,270 | 9/1992 | Darden . |
| 5,156,475 | 10/1992 | Zilberman . |
| 5,160,919 | 11/1992 | Mohler et al. . |
| 5,161,760 | 11/1992 | Terbrack . |
| 5,163,646 | 11/1992 | Engelhardt . |
| 5,164,712 | 11/1992 | Niitsuma . |
| 5,175,672 | 12/1992 | Conner et al. . |
| 5,183,230 | 2/1993 | Walker et al. . |
| 5,212,473 | 5/1993 | Louis . |
| 5,242,139 | 9/1993 | Aldrich . |
| 5,244,296 | 9/1993 | Jensen . |
| 5,326,056 | 7/1994 | Smith . |

PREHENSILE POSITIONING COMPUTER KEYBOARD

CROSS REFERENCES TO RELATED APPLICATIONS

This application is a continuation-in-part of application Ser. No. 07/939,618, filed Sep. 21, 1992 (now abandoned), which is a continuation-in-part of application Ser. No. 07/846,710, filed Mar. 6, 1992 now U.S. Pat. No. 5,339,097, which is a continuation-in-part of application Ser. No. 07/328,234, filed Mar. 24, 1989, now U.S. Pat. No. 5,119,078, which is a continuation-in-part of application Ser. No. 07/033,039, filed Mar. 31, 1987 (now abandoned), which is a continuation-in-part of application Ser. No. 06/921,616, filed Oct. 21, 1986 (now abandoned), the disclosure of which applications are incorporated herein reference.

This application is also related to application Ser. No. 29/004,848, filed Feb. 16, 1993 for a Computer Keyboard and application Ser. No. 08/042,017, filed Apr. 2, 1993 for a Keyboard Alignment Device, the disclosure of which applications are incorporated herein by reference.

FIELD OF THE INVENTION

This invention relates to the art of electronic apparatus, and particularly relates to a computer keyboard having two keypad surfaces in a V-shape having first and second surfaces approaching a center peak and sloping downward and away from each other.

BACKGROUND OF THE INVENTION

Office equipment utilizing a video display and keyboard input is known. The widespread use of these devices has proven that, in many cases, severe physical strain results from their daily use. Many attempts have been made to reduce the strain caused by these devices by positioning the keyboard, display screen, and other associated components appropriately. None of these solutions has been completely successful.

One company, PROFORMIX, offers a negative-slope keyboard support that is positioned below a desk top by an angled bracket. The keyboard support is part of an integrated workstation system including a copyholder, a mouse and a writing platform as part of an effort to improve overall body posture.

Traditional flat/rectangular keyboards typically taper from a low front elevation to a slightly higher rear elevation. In addition, these keyboards usually have an adjustable support which can further elevate the rear surface.

Depending upon the height of the desk that supports the keyboard, the hand-wrist junction of the user will either be in (a) a neutral position, or undesirably postured into either (b) a flexion position, or (c) an extension position.

The effect of the configuration of present-day keyboards is to force the hand-wrist junction into an undesirable extension posture to access the keyboard. A neutral hand-wrist posture is only possible if the keyboard platform is set at a much higher plane, i.e. at approximately thirty-six inches, as opposed to an average desk height of approximately twenty-five to twenty-seven inches. This extension posture of the hand-wrist junction is evident when the user chooses to access the keyboard with the wrist higher than the elbow.

In using a computer, the relation of vision to hand/finger actuated keyboard usage in performing fine motor-coordinated functions is influenced by the physical location, size, and collective placement of the keys. Traditional nonprehensile flat/rectangular keyboard applications usually require a high and nearly constant level of visual attention.

Workpace and related physiological changes, aging, onset of monocularization (intermittent lapsing of binocularity for near vision) that accompanies presbyopia, tool colors, and background contrast are factors affecting constancy of visual attention to task performance. Capitas extension, excessive excyclotorsion, and repetitive strain injuries (such as carpal tunnel syndrome) are common and debilitating concomitants to computer usage. These problems can be remedied by improved keyboard design.

SUMMARY OF THE INVENTION

Tool acquisition (wherein the tool is to be securely controlled within the structure of the hand) preparatory to tool usage requires that this appendage be adapted for seizing and grasping. The essential characteristics of prehensility is that we do have an anatomically opposable thumb and, with some variations, it functions with a ventral-to-ventral surface apposition of the thumb to the finger(s).

Nonprehensile tool usage involves pushing or in some other manner moving a tool without (its) being held in control within the hand, and does not possess the same level of precision, sensitivity, and gentle control that is attributable to prehensile activity. The usage of traditional flat/rectangular computer keyboards mandates that the hands be fully pronated into the horizontal plane and ulnar-deviated outward at the hand-wrist junction, and therein lies a major cause of repetitive strain injuries.

Tool usage within this environment would have to be considered nonprehensile, because the percussion of each key is executed in a direction which is essentially away from the action and the range-of-motion of the opposable thumb. It has been beneficially recognized that if the keyboard is reshaped into a biometric form incorporating a moderate V-shape and moderate center-peaking, these attributes permit a relatively straight hand-wrist junction and allow for less pronation of the hands into the horizontal plane.

It is known that three ocular-neurological physiological functions are linked to form a "Near-Triad" when a subject is engaged in a task requiring the use of near vision, such as reading. These three functions are accommodation, convergence, and miosis. Accommodation is the focusing of the eye to form a clear image of the close subject, convergence is the angular relationship between the two eyes to observe that near subject, and miosis is a contraction of the pupils of the eyes.

Applicant has concluded that there are, in fact, two additional ocular-neurological physiological functions associated with a task at a close distance. These additional functions are the preferred depression of gaze and undesirable excyclotorsion which accompanies viewing targets which are both close to the observer and are placed relatively high in the visual field. The depression of gaze refers to the location of the work with respect to a horizontal line at eye level, and excyclotorsion refers to an outward rotation of the superior meridian of the eyes about their anterior-posterior geometric axes. While an individual can override the depression of gaze component and thereby focus clearly on a near object having a high placement in the visual field, this commonly produces symptoms such as eyestrain, headache, nausea and motion-sickness. Neck and shoulder discomfort also occur because the individual will posture into a capitas-extension position (head tipped backward-chin elevated) as a means of allowing an artificial (or false) depression of gaze and minimizing excyclotorsion. The five factors may be referred to as a "near quintad."

One factor producing increased tension is that the typical word processing or personal computer keyboard has approximately 85 keys (or even more), compared with no more than 60 keys for a typewriter. An operator is required to look at these keys frequently because the locations of many of the keys are not automatically known, as are the locations of the alphabet keys. Also, virtually all software programs require the use of several unfamiliar keys simultaneously, such as "Alt-F5, Shift-F10 or Control-F2." Thus, the modern keyboard must be considered to be a tool having 85 or more choices for which the operator must repeatedly view the keyboard and then the screen to select one or more keys and to verify completion of an operation.

Studies indicate that excyclotorsion, which accompanies convergence, is reduced if the direction of gaze is depressed. The greatest subjective comfort is produced when the visual target is placed in a depressed position of gaze.

The prior art has failed to adequately address these physiological factors, and no apparatus has been provided which simultaneously addresses the five functions (the "near quintad") found by Applicant to be significant.

A preferred computer keyboard is designed such that a user may acquire total tactile familiarity with the keyboard, thus enabling the user to copy written material and look at the screen while typing without looking at the keyboard. One embodiment of the keyboard of the invention is divided at its midpoint by a central peak and the outer portions slant downwardly and away from the central peak and upwardly away from the user to form a shallow V-shape.

The V-shaped keyboard configuration lessens ulnar abducted deviation and permits a relatively straight hand-wrist orientation. The center-peak design also lessens the amount of hand pronation, i.e. the rotation of the hands from a comfortable vertical posture into an uncomfortable horizontal posture. Further, the V-shaped arrangement enables the forearms to be separated, allowing for unobstructed visual access to a copy-viewing area. Strain on the hands and wrists is minimized and occupationally-induced injuries, such as carpal tunnel syndrome, are avoided.

The space bars are placed on the front edge of the keyboard surfaces and are activated by thumb pressure either vertically (conventionally), horizontally or at a selected angle. When the space bars are activated horizontally, the thumb moves in a natural grasping motion toward the forefinger.

The keyboard for the computer is used with the hands of a user disposed substantially in a prehensile position with the thumb opposed to the fingers in a grasping position. The keyboard includes a first slanting keyboard surface for locating keys to be activated by a user's left hand and sloping downwardly away from a second slanting keyboard surface for locating keys to be activated by a user's right hand. The first and second keyboard surfaces are separated at a peaked central portion which widens out as it approaches the user. Twelve numbered function keys are positioned in a circular array or any other geometric array, toward an outward end of the first keyboard surface. A keypad for locating numeric keys is positioned toward an outward end of the second keyboard surface.

A cursor control unit or trackball, on a front surface of the keyboard, below the space bars, is used for controlling the movement of a cursor and is operated by the thumb of the user in a direction transverse to the direction of operation of the keys. A cursor-mover control button extends between the space bars and the trackball for actuation of a cursor controlled movement.

The space bars may also be operated in the transverse direction or at a selected angle. Ulnar abduction and hand pronation are reduced by using the keyboard, thus reducing the incidence of carpal tunnel syndrome.

A track ball located on an inclined front surface is operated by the hands of the operator placed in a natural prehensile posture for utilization of the thumbs to actuate the track ball, while the forefingers move towards the thumbs in actuating a cursor-move control button. The forefinger actuation of the cursor-mover control button can either be simultaneous or sequential to the thumb actuation of the track ball.

In a pre-motion rest position, the two ventral surfaces of the thumb and forefinger are separated by a distance of less than 1.5 inches. At the moment of actuation of the cursor-mover control button, there is a very slight articulation of the proximal joint of the forefinger, while the thumb position remains stationary on the track ball. The pre-motion rest position gap between the thumb and forefinger being less than 1.5 inches, all possible movements of the trackball by the thumb, and all possible actuations of the cursor-mover control button by the forefinger requires a very small range of travel of these digits. The ventral to ventral compressive force between the thumb and forefinger is thereby minimized. Physiological fatigue that accompanies repetitive precision gripping/grasping actions is also thereby minimized.

In addition, on the upper front surface of the keyboard are two lateral ramps or palm rests which are angled downwardly and outwardly from the cursor-mover control button. These ramps serve to guide the hand-wrist junction into a semi-pronated posture in accessing the keyboard. A central recess located between the two lateral ramps includes the trackball and trackball cursor-mover control button and ensures that only the outer area of the heel of each palm is in physical contact with the ramps. This minimizes the restriction of hand-wrist motility in performing keyboard keystroking, and therefore minimizes errors.

In accessing a computer keyboard, there are four desirable hand/wrist/finger/thumb working postures. First, there is a relatively straight hand/wrist position. Second, there is a less than 90° hand rotation (pronation) into a horizontal plane. Third, there is a vertical, neutral hand/wrist position where the hand is either extended upwardly above the axis of the forearm, or flexed below the axis of the forearm. Fourth, the keys such as the space bar, which are designed to be actuated by the thumb(s), are so actuated by the thumb(s) moving towards the finger(s) in a natural grasping (prehensile) movement.

By the present invention, a keyboard is provided so as to satisfy at least three of the above-listed working postures, and preferably, the second and third working posture. These objects are achieved by the use of elevators positioned at a front and rear edge of a bottom surface of the keyboard which may be folded out of the way so that the keyboard may lie flat or be alternately extendable to elevate either a front or a rear of the keyboard.

Vertical hand/wrist positioning is a product of combined influences of the computer user's height, chair height and keyboard platform height. If these combined influences are such that:

1. The hand/wrist junction is above the bottom of the elbow, by approximately 7°–10°, then accessing the keyboard, will produce a vertical, neutral hand/wrist posture;
2. If the hand/wrist junction is above the elbow, then the rear of the keyboard needs to be elevated so that the operational surface of the keyboard remains parallel to the vertical, neutral hand/wrist posture;
3. If the hand/wrist junction is at the same level as the elbow, then the front of the keyboard needs to be elevated so that its operational surface remains parallel to a vertical, neutral hand/wrist posture; and
4. If the hand/wrist junction is below the level of the elbow, then the front of the keyboard has to be elevated to remain parallel to the operational surface of the keyboard and the vertical, neutral hand/wrist posture. If the user chooses to access the keyboard with the wrist lower than the elbow, then in order to approximate a neutral hand-wrist junction, the keyboard platform has to be angled downward from front to back.

To achieve these goals, foldable legs at a rear edge of the keyboard are used to elevate the keyboard to provide a back-to-front slant. This will satisfy the condition set forth in numbered paragraph 2 above.

Further, foldable legs at a front edge of the keyboard are used to elevate the front edge of the keyboard. This will vary the front elevation of the keyboard to satisfy the condition described in numbered paragraphs 3 and 4 listed above.

Due to the versatility of the keyboard to create three separate angled positions, a vertical, neutral hand/wrist posture is achievable, regardless of the height of the user, chair height and desk height.

It is therefore an object of the present invention to provide a computer keyboard which provides prehensile alignment of a hand-wrist junction by a specifically-configured keyboard.

It is another object of the present invention to provide a computer keyboard which provides prehensile alignment of a hand-wrist junction by a specifically-configured keyboard with two surfaces of the keypad slanting up towards each other and approaching a central peak.

It is yet another object of the present invention to provide a computer keyboard which provides prehensile alignment of a hand-wrist junction by a specifically-configured keyboard with two surfaces of the keypad slanting up towards each other and approaching a central peak with a trackball and cursor-mover control button aligned with the central peak between the two surfaces of the keyboard.

It is still yet another object of the present invention to provide a computer keyboard which provides prehensile alignment of a hand-wrist junction by a specifically-configured keyboard with two surfaces of the keypad slanting up towards each other and approaching a central peak with a trackball and cursor-mover control button aligned with the central peak between the two surfaces of the keyboard including two palm rest sections sloping downwardly and outwardly from the trackball and cursor-mover control button for aligning the hand-wrist junction and elbow of an operator in a prehensile position with respect to the keyboard and trackball.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

A keyboard of the present invention particularly reduces the onset and severity of, or prevents entirely, the repetitive strain injury known as carpal tunnel syndrome, as well as other neurological or orthopedic malfunctions, such as tendinitis and tenosynovitis, which can also be related to usage of a flat/rectangular keyboard. These malfunctions, particularly carpal tunnel syndrome, occur when using a flat/rectangular computer keyboard which requires the hands to be fully pronated into the horizontal plane and ulnar-deviated outward at the hand-wrist junction, with a finger-flexed position. In this position, there is mechanical compression of the median nerve against the transverse carpal ligament (complicated by venous congestion) as the median nerve passes from the forearm into the hand. In this position, percussion of each key is executed in a direction which is essentially away from the action and the range of motion of the opposable thumb.

In contrast, when the hands are positioned for using a biometrically formed, center-peaked keyboard of the invention, the hands are advantageously in a prehensile orientation with the ventral surfaces of the thumb and fingers of each hand in opposed positions similar to the positions used for grasping a small object between the thumb and a finger. Prehensility, because it increases the total tactile familiarity with the keyboard, can reduce the level of visual demand to accomplish the task as well as reducing the stress on the fingers, hands and wrists.

A moderately center-peaked keyboard of the invention having keyboard halves which slope downwardly and away from each other in a V-shape allow the hands to be positioned in the optimum prehensile position with a straight hand-wrist posture. This position is substantially stressless when compared with the hand position used for operating a conventional keyboard because it permits a relatively straight hand-wrist position and less hand pronation. Carpal tunnel syndrome and other neurological or orthopedic malfunctions are not likely to be manifested while using the keyboard described.

A keyboard of the invention may further include a cursor control unit, as discussed below, which is positioned on a surface substantially transverse to the key surfaces. This allows the user to actuate the cursor control unit in a natural grasp/palmar pinch motion with the hands in a prehensile position, without having to flex the fingers during use and without having to move either hand away from a base or home position on the keyboard.

The cursor-mover control unit is operated by the user's thumbs by pressing the unit inward in a direction transverse to the direction of operation of the keys of the keyboard. Pressure on a portion of the cursor-mover control unit causes the cursor to move on the display screen in the direction of the portion of the unit pressed. Both hands are in a prehensile position with the fingers and thumb of each hand in a grasping posture and both hands work together, reinforcing or opposing each other, when using the cursor-mover control unit to effectuate precisely refined movement and placement of the cursor on the screen. The cursor-mover control unit may include a concave or convex (trackball) surface which rotates around a universal joint and pressure of both thumbs, either reinforcing or opposing each other may be used.

With reference to the drawings, in general, and to FIGS. 1–10, in particular, a computer keyboard embodying the teachings of the subject invention is generally designated as 20. With reference to its orientation in FIG. 1, the computer keyboard includes a body 22 having two surfaces 24 and 26 for containing the typing keys associated with a normal keyboard. A central spine or peak portion 28 separates the two surfaces 24 and 26. Each surface 24, 26 tapers downwardly from the central spine and away from the operator in a V-shape at an angle of 8° to 12°, and preferably 10°.

Figure 1:
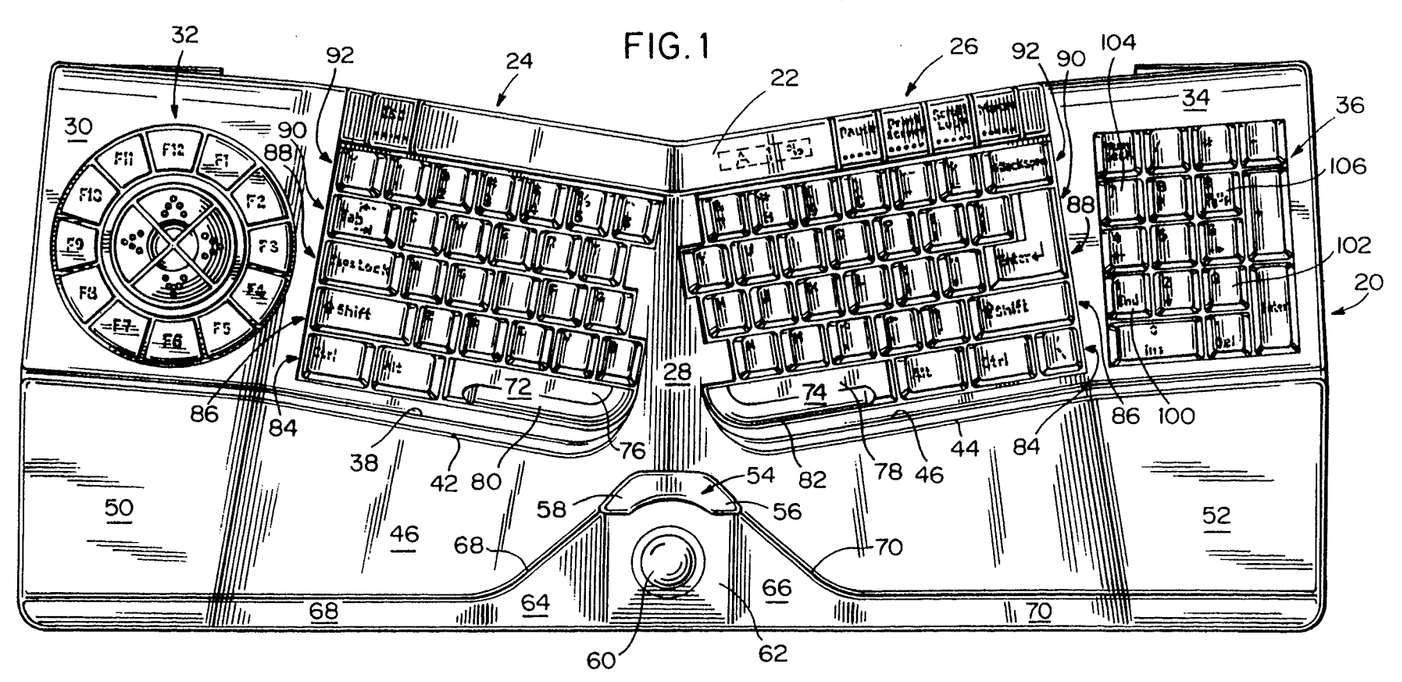
FIG. 1 is top plan view of the computer keyboard of the present invention.
Figure 2:
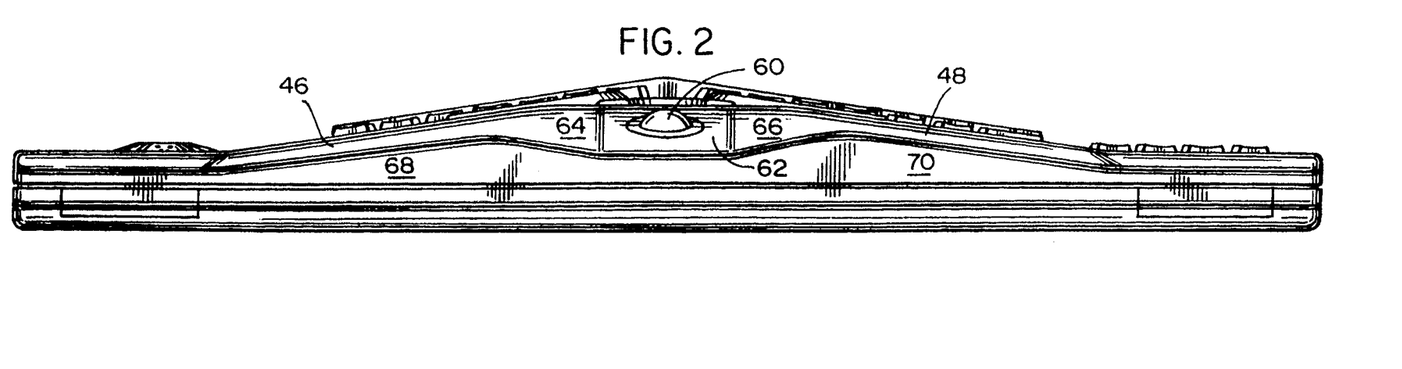
FIG. 2 is a front view of the computer keyboard.
Figure 3:
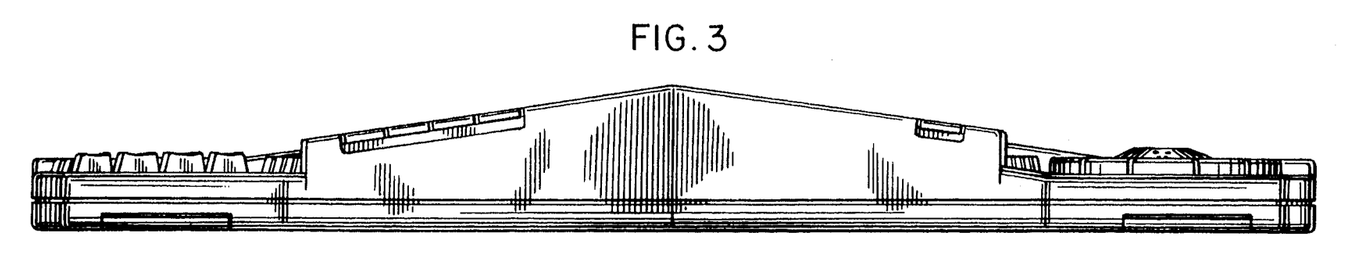
FIG. 3 is a rear view of the computer keyboard.
Figure 4:
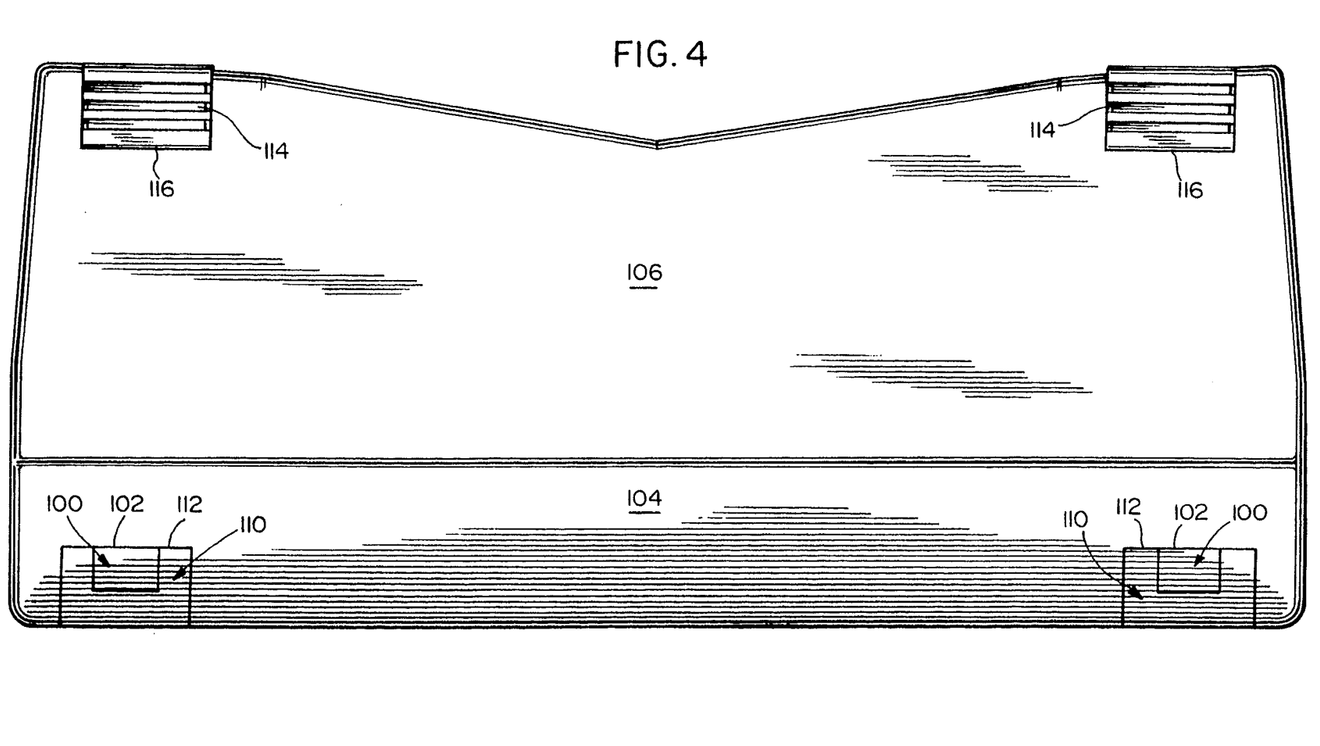
FIG. 4 is a bottom plan view of the computer keyboard.

Surface 24 tapers down towards horizontally oriented surface 30 including a clock face function circle 32. Surface 26 tapers downwardly towards horizontally oriented surface 34 including a numeric keypad 36.

In the numeric keypad 36, the keys bearing numbers are arranged as known in the art, and in addition, key 100, bearing numeral 1, functions as the "END" key; key 102, bearing the numeral 3, functions as the "PAGE DOWN" key; key 104, bearing the numeral 7, functions as the "HOME" key; and key 106, bearing the numeral 9, additionally functions as the "PAGE UP" key. Further keys are arranged around the numeric keypad 36 so that they are easily reached by fingers of the right hand.

In the center of the clock face function circle 32 are four segments for directional cursor movements. The segments have projections in the shape of an arrow indicative of the direction of movement of the cursor represented by the appropriate segment.

A user having acquired total tactile familiarity with the keyboard will readily be able to touch-type the combinations associated with use of the function keys. In contrast, known systems require the user to look at the keyboard when using the function keys, and significant time is lost in searching for the keys needed.

The keys contained in inclined surfaces 24 and 26 are recessed below the level of the central spine or peak portion 28. Therefore, a leading edge 38, 40 of the respective surfaces 24, 26 tapers upwardly at an angle of approximately 60° to a trailing edge 42, 44 of palm rests 46, 48. Palm rests 46, 48 taper downwardly from central spine 28 at an angle of 5° to 15°, preferably 8° to 12°, and most preferably 10°, towards terminal horizontal surfaces 50, 52 respectively.

On the same level as the central spine or peak portion 28 is located a cursor-mover control button 54. This approximately C-shaped control button 54 includes two microswitches (not shown) at opposite ends 56 and 58 of the control button 54 so that no matter where the control button 54 is depressed, engagement of a microswitch is made to actuate a control function.

The cursor-mover control button 54 actuates a positioning of a cursor as positioned by movement of a trackball 60. Trackball 60 projects from an inclined surface 62 which extends at a downward decline from the surface of the central spine 28 from which the cursor-mover control button 54 projects, at an angle of 15° to 25°, preferably 20°. Tapering surfaces 64 and 66 leading to surface 62 are inclined from surface 62 up towards ridges 68, 70 leading to palm rests 46 and 48 at an angle of approximately 12°. Surfaces 64, 66 also extend into leading surfaces 68, 70 which taper downwardly from the palm rests 46, 48, at an angle of approximately 15°.

Trackball 60 has a convex surface which rotates around a universal joint (not shown) and pressure of both thumbs, either reinforcing or opposing each other may be used for moving the cursor. The hands of the user are in prehensile position when the ball-shaped trackball or cursor control unit is used.

The keys contained in the inclined surfaces 24 and 26 are arranged in a normal "QWERTY" arrangement. However, the height of the divided space bars 72, 74 are recessed to project only slightly above the height of the palm rest sections 46, 48. With the hand of the operator resting in a prehensile position, it is possible for the thumb of the operator to move across the palm rest portions 46, 48 and in a horizontal stroking motion depress the space bars 72, 74. Therefore, it is seen that the space bars 72, 74 have an upper surface 76, 78 which are positioned substantially horizontally whereas a leading surface 80, 82 is inclined at an angle of approximately 55° to guide the thumb across the space bar in a horizontal movement for actuation of the space bars 72, 74. In particular, pressure on front surfaces 80, 82 allows the user to press space bars 72, 74 with a natural "grasping" motion of the thumb toward the forefinger.

Also, in the first row of keys indicated by arrows 84 and the second row of keys indicated by arrows 86, all of the keys, except for the space bars, are tapered rearwardly having a higher leading edge of the keys than a trailing edge which are inclined upwardly at an angle of approximately 15° from the trailing edge towards the leading edge. The third row of keys as indicated by arrows 88 are inclined upwardly at an angle of approximately 8° from their trailing edge towards a leading edge. The fourth row of keys as indicated by arrows 90 are inclined upwardly at an angle of approximately 4° from their trailing edge up towards their leading edge. The fifth row of keys as indicated by arrows 92 are substantially aligned horizontally. In addition, all the keys include a concave curvature from side to side.

In the clock face function circle 32, the function keys F12, F3, F6 and F9 are arranged in the cardinal hour positions of twelve, three, six and nine o'clock. Alternately, the function keys can be spaced across the trailing edge of the keyboard as is done in known keyboards.

Figure 13A:
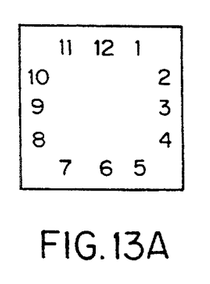
FIGS. 13A through 13I schematically illustrate alternate embodiments for the positioning of function keys.
Figure 13B:
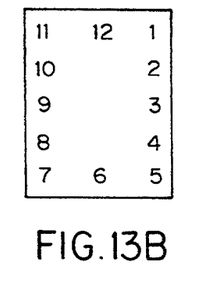
Figure 13C:
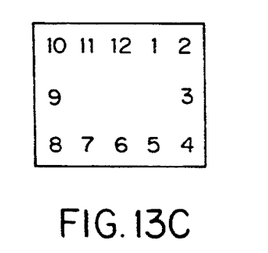
Figure 13D:
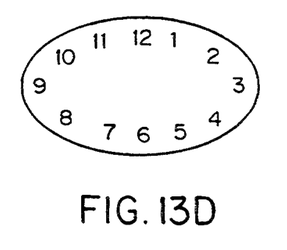
Figure 13E:
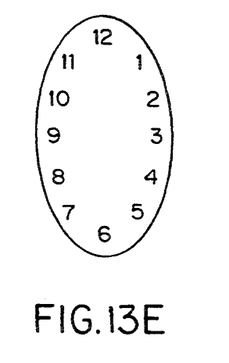
Figure 13F:
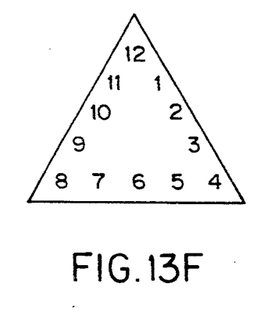
Figure 13G:
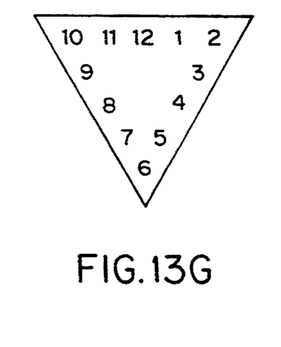
Figure 13H:
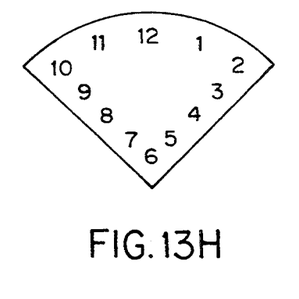
Figure 13I:
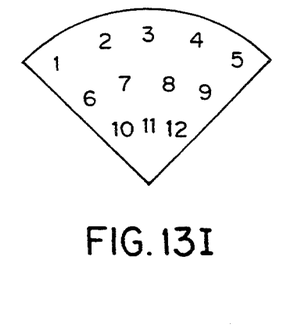

Alternately, the function keys are provided in different arrangements, as schematically shown in FIGS. 13A through 13I, with the cardinal keys maintained in the traditional position as shown in FIGS. 13A through 13H, or in a non-traditional position as shown in FIG. 13I.

Figure 14:
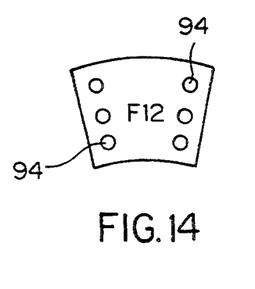
FIG. 14 illustrates an alternate embodiment of a cardinal key.

The variations of the pattern of function keys may be square, rectangular, oval (with long axes either horizontal or vertical), triangular (with the apex aligned either up or down). In addition, as schematically shown in FIG. 14, the cardinal keys are tactilly differentiated by projections 94, for example, and/or differentiated from adjacent surrounding keys by color. It is understood that the numerals depicted in FIGS. 13A through 13I depict individual keys isolated from adjacent keys so as to activate different functions in conjunction with the SHIFT, ALT, and CTRL keys.

Figure 5:
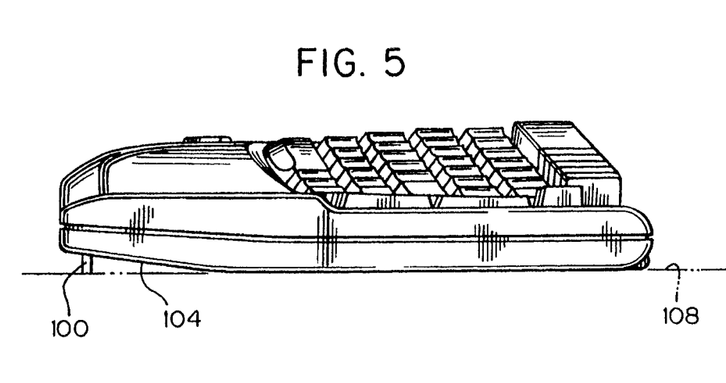
FIG. 5 is a right side view of the computer keyboard.
Figure 6:
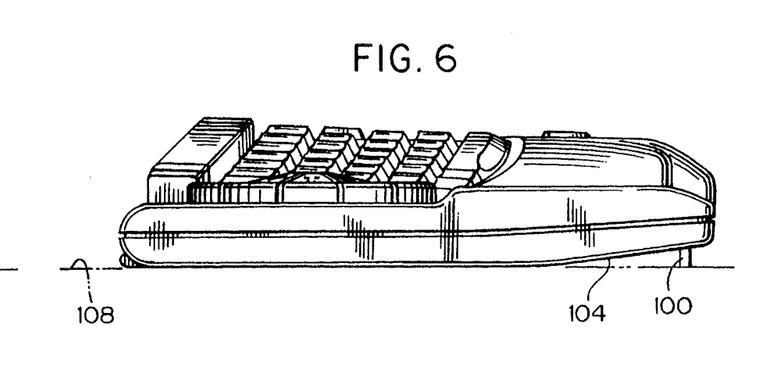
FIG. 6 is a left side view of the computer keyboard.

To ensure the stability of the keyboard 20 on a flat surface, a pair of leveling legs 100 pivoted along edge 102 are secured to a tapered bottom surface 104 which tapers upwardly from bottom surface 106. As shown in FIGS. 5 and 6, the levelling legs 100 stabilize the leading edge of the keyboard with respect to a flat desk surface 108.

Figure 7:
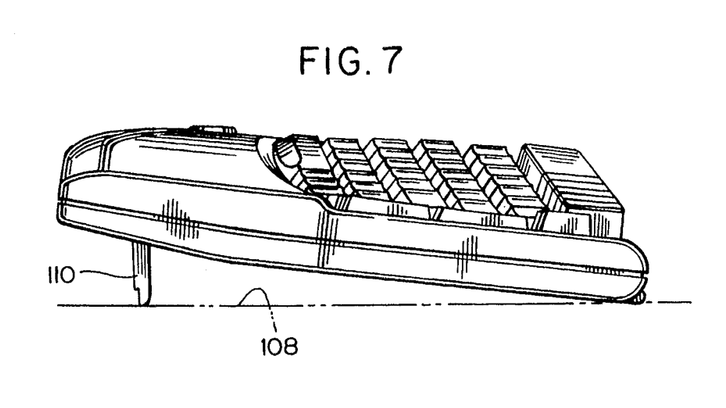
FIG. 7 is a right side view of the computer keyboard with the front of the computer keyboard elevated.

If, as previously discussed, it is necessary to elevate the front end of the keyboard, elevating legs 110 pivotally mounted to surface 104 about edge 112 are swung out to a position as shown in FIG. 7 to increase the incline from the trailing edge to the leading edge of the keyboard. With elevating legs 110 used, surface 62 is elevated to approximately 15°.

Figure 8:
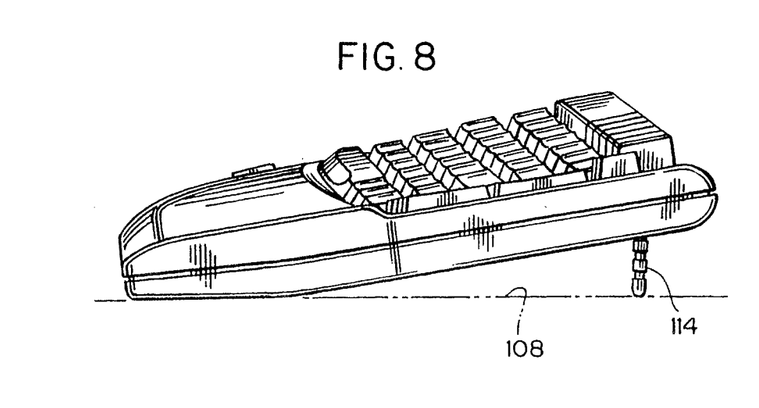
FIG. 8 is a right side view of the computer keyboard with the rear of the computer keyboard elevated.
Figure 9:
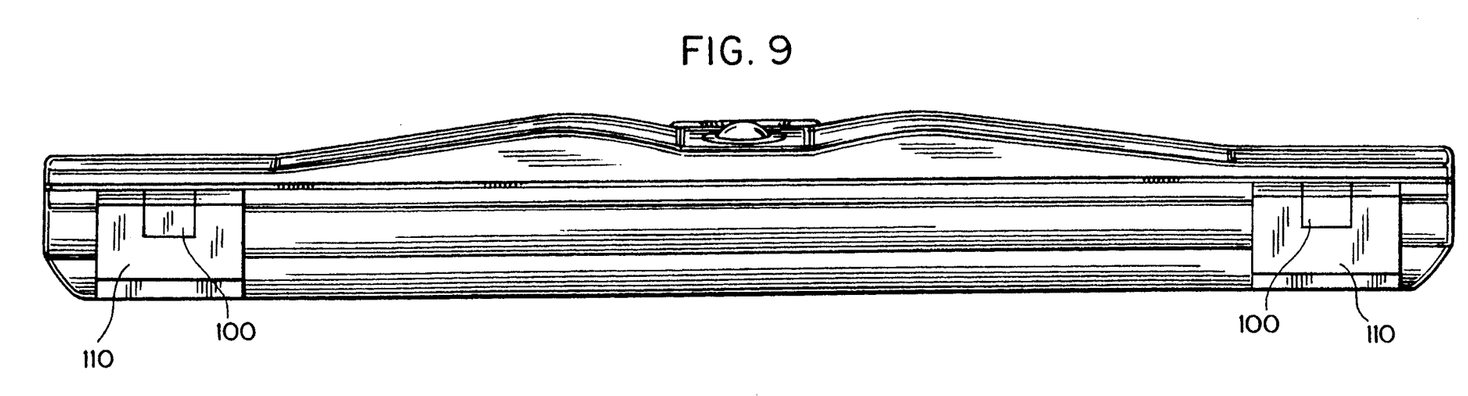
FIG. 9 is a front view of the computer keyboard as shown in FIG. 7.
Figure 10:
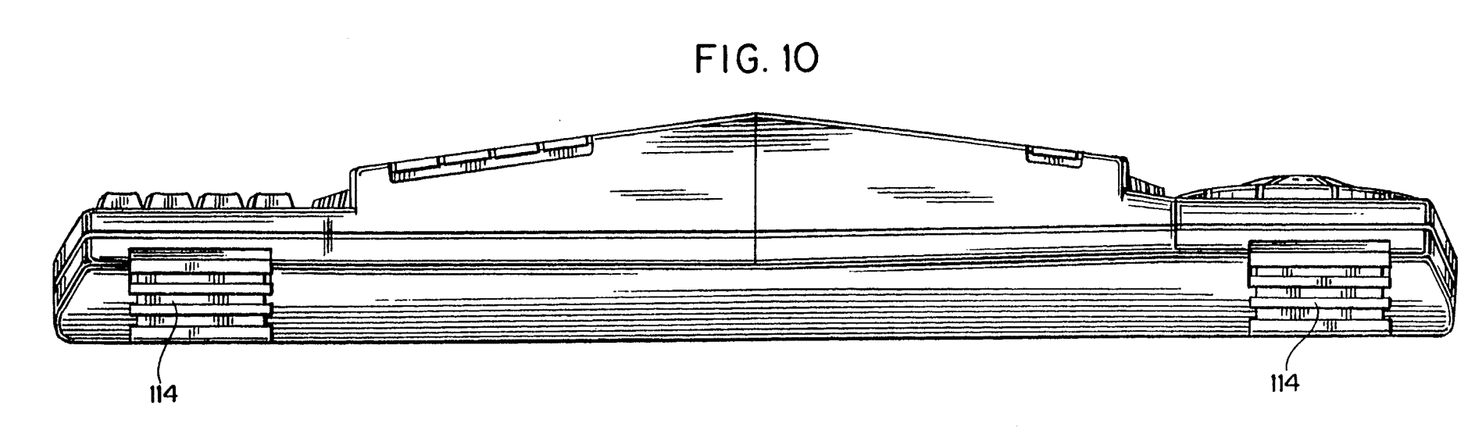
FIG. 10 is a rear view of the computer keyboard as shown in FIG. 8.

Alternately, if the trailing edge of the keyboard needs to be elevated, rear legs 114 pivoted about edge 116 connected to the bottom surface 106 are swung into the position shown in FIG. 8. With rear legs 114 elevated, surface 62 is elevated to approximately 32°.

Figure 11:
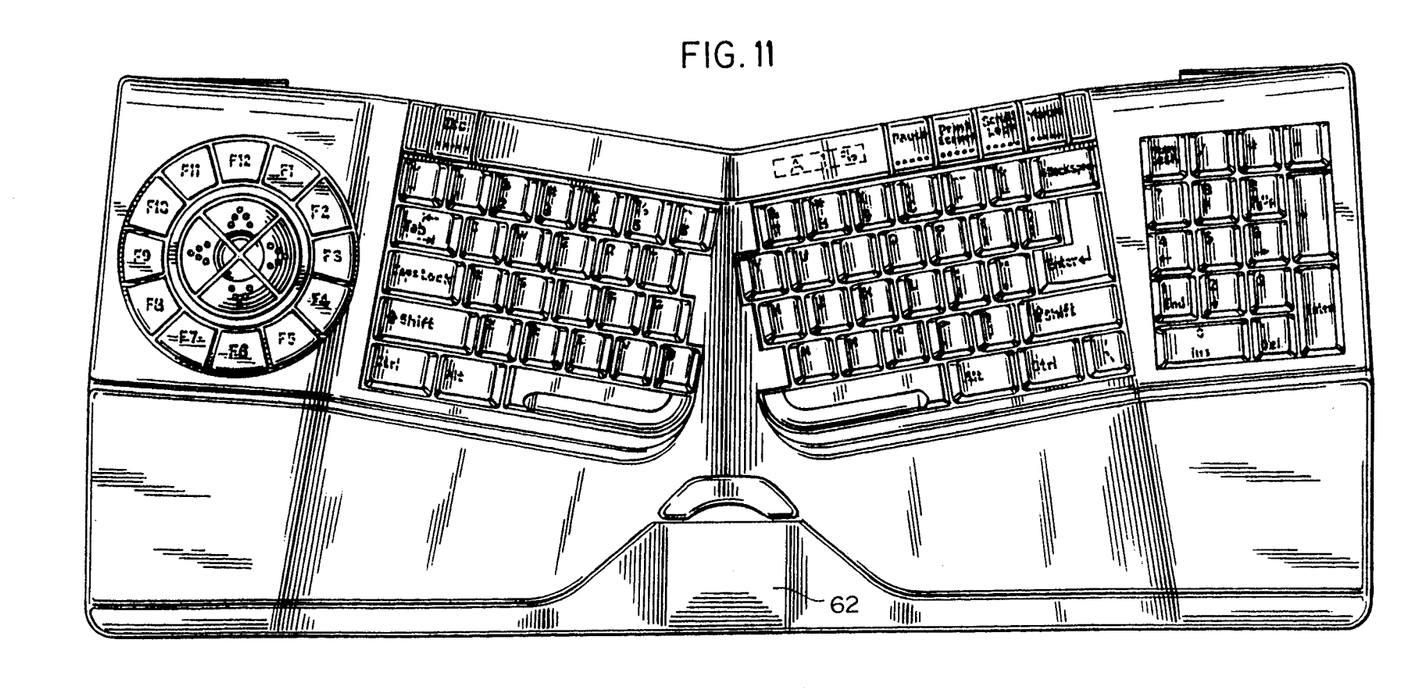
FIG. 11 is a top plan view of an alternate embodiment of the computer keyboard.
Figure 12:
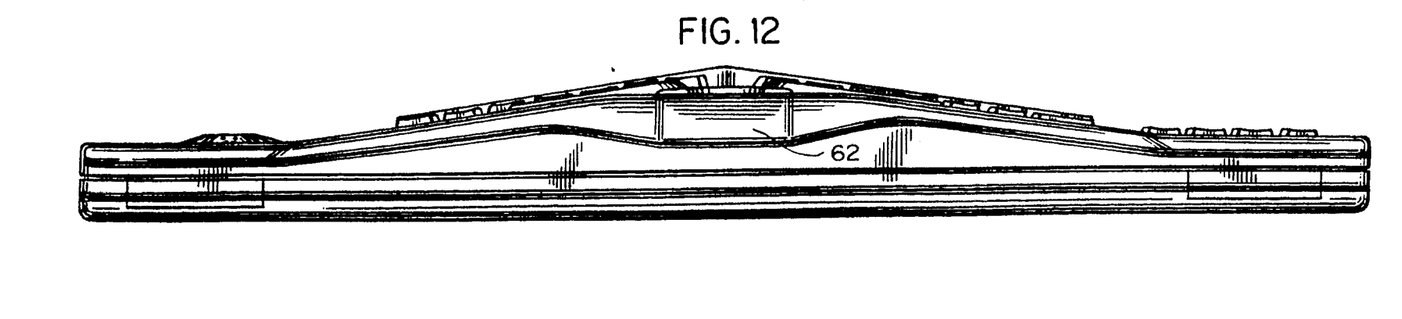
FIG. 12 is a front view of the computer keyboard shown in FIG. 11.

With reference to FIGS. 11 and 12, an alternate embodiment of the present invention is disclosed. In this embodiment, a surface 62 is completely flat, without a trackball. By this arrangement, surface 62 becomes a resting platform for the thumbs and the forefingers and these digits may maintain a comfortable prehensile posture during work breaks.

Having described the invention, many modifications thereto will become apparent to those skilled in the art to which it pertains without deviation from the spirit of the invention as defined by the scope of the appended claims.

I claim:

1. A computer keyboard comprising:
a body having a leading edge closest to the user,
a first keyboard surface of said body,
a second keyboard surface of said body,
a portion of said body dividing said first keyboard surface from said second keyboard surface in a V-shape, said first keyboard surface and said second keyboard surface rising towards said portion, and
palm rest means of said body angled downwardly and outwardly from said portion of said body for supporting the palms of an operator as the fingers of the operator contact keys on said first keyboard surface and said second keyboard surface so that a hand-wrist junction and elbow of the operator are guided into a prehensile position with respect to the keyboard,
said body including means for elevating said leading edge of said body from a first position to a second position so that said body is positionable to at least a substantially horizontal orientation.

2. A computer keyboard as claimed in claim 1, wherein said body includes means for elevating a trailing edge of said body from a first position to a second position.

3. A computer keyboard as claimed in claim 1, wherein a cursor-mover control button is located on said body.

4. A computer keyboard as claimed in claim 3, wherein said cursor-mover control button is located at said portion for a prehensile arrangement of the fingers and thumbs of the operator to move said trackball and actuate said cursor-mover control button.

5. A computer keyboard as claimed in claim 1, wherein said body includes function keys and a numeric keypad.

6. A computer keyboard as claimed in claim 5, wherein said function keys are arranged in a circle.

7. A computer keyboard as claimed in claim 5, wherein said function keys are arranged in a multi-sided arrangement.

8. A computer keyboard comprising:
a body having a leading edge closest to the user,
a first keyboard surface of said body,
a second keyboard surface of said body,
a portion of said body dividing said first keyboard surface from said second keyboard surface in a V-shape, said first keyboard surface and said second keyboard surface rising towards said portion,
palm rest means of said body angled downwardly and outwardly from said portion of said body for supporting the palms of an operator as the fingers of the operator contact keys on said first keyboard surface and said second keyboard surface so that a hand-wrist junction and elbow of the operator are guided into a prehensile position with respect to the keyboard, and
trackball means for controlling movement of a cursor with the hands of the operator aligned in a prehensile position,
said body including means for elevating said leading edge of said body from a first position to a second position so that said body is positionable to at least a substantially horizontal orientation.

9. A computer keyboard as claimed in claim 8, wherein said body includes means for elevating a trailing edge of said body from a first position to a second position.

10. A computer keyboard as claimed in claim 8, wherein said body includes function keys and a numeric keypad.

11. A computer keyboard as claimed in claim 10, wherein said function keys are arranged in a circle.

12. A computer keyboard as claimed in claim 10, wherein said function keys are arranged in a multi-sided arrangement.

13. A keyboard for a computer for operating with hands of a user disposed in a prehensile position, said keyboard comprising:
a keyboard body;
keyboard means located at an upper surface of said keyboard body comprising first and second transverse surfaces with a common edge located centrally with respect to a length of said keyboard means, said common edge located through the entire width of said keyboard means, and having keys for depressing by movement of fingers of a user in a first direction;
spacing means mounted at a forward edge of said keyboard means for operating by movement of a thumb of the user;
activating means mounted on said keyboard body on a third surface transverse to each of said first and second transverse surfaces, located centrally with respect to a length of said keyboard means for rotational movement of said activating means in all directions to control all directions of movement of a cursor on a display screen of the computer by movement of at least one thumb of a user in a second direction transverse to said first direction for engagement of said keyboard means and said activating means by the user's hands disposed substantially in a prehensile alignment position with the thumb opposed to the fingers in a substantially grasping motion between the thumb and fingers of the user to cause actuation of said keyboard means and said activating means while the thumb and fingers are in close proximity in prehensile alignment when using the keyboard and whereby ulnar abducted deviation and hand-pronation are reduced; and
two lateral ramps of said body angled downwardly from said first and second transverse surfaces with said third surface located between said two lateral ramps.

14. A keyboard for a computer, said keyboard comprising:
a keyboard body,
first activating means located on at least one first upper surface of said keyboard body comprising first and second transverse surfaces with a common edge located centrally with respect to a length of said first activating means, said common edge located through the entire width of said first activating means, for actuation of said first activating means by movement of fingers of a user;
second activating means fixed and projecting from a third surface of said keyboard body, located centrally with respect to a length of said first activating means for rotational movement in all directions to control all directions of movement of a cursor on a display screen of the computer by at least one thumb of the user,
said third surface extending transverse to said first and second transverse surfaces for engagement of said first activating means and said second activating means by hands of a user positioned in a prehensile alignment so that a substantially grasping motion between the at least one thumb and fingers of the user can cause actuation of both said first activating means and said second activating means while said at least one thumb and fingers are in a close proximity in prehensile alignment; and
two lateral ramps of said body angled downwardly from said first and second transverse surfaces with said third surface located between said two lateral ramps.

15. A keyboard for a computer, said keyboard comprising:
a keyboard body;
first activating means located on first and second upper slanting keyboard surfaces of said keyboard body comprising keys for depressing by fingers of a user's left and right hands respectively, said first and second slanting keyboard surfaces joined at a peak central edge forming a V-shape which slopes downwardly toward the user and laterally away from the user, said peak central edge located through the entire width of said first activating means;
second activating means on a third surface of said keyboard body, located centrally with respect to a length of said first activating means for rotational movement in all directions to control all directions of movement of a cursor on a display screen of the computer by at least one thumb of the user,
said third surface extending transverse to said first and second upper slanting keyboard surfaces for engagement of said first activating means and said second activating means by hands of a user disposed in a substantially prehensile alignment position with substantially straight wrist during use so that a substantially grasping motion between the at least one thumb and fingers of the user can cause actuation of said first activating means and said second activating means while said at least one thumb and fingers are in a close proximity in prehensile alignment; and
two lateral ramps of said body angled downwardly from said first and second transverse surfaces with said third surface located between said two lateral ramps.

16. A computer keyboard comprising:
a body having a leading edge closest to the user and a trailing edge furthest from the user,
a first keyboard surface of said body,
a second keyboard surface of said body,
a portion of said body dividing said first keyboard surface from said second keyboard surface in a V-shape, said first keyboard surface and said second keyboard surface rising towards said portion, and
palm rest means of said body angled downwardly and outwardly from said portion of said body for supporting the palms of an operator,
said body including means for elevating said leading edge of said body from a first position to a second position so that said leading edge of said body is higher than a trailing edge of said body.

17. A computer keyboard as claimed in claim 16, wherein said body, when the leading edge is in the second position, is in a substantially horizontal orientation.

18. A computer keyboard as claimed in claim 16, wherein said body, when the leading edge is in the second position, is in a greater than horizontal orientation.

19. A computer keyboard comprising:
a body having a leading edge closest to the user,
a first keyboard surface of said body,
a second keyboard surface of said body,
a portion of said body dividing said first keyboard surface from said second keyboard surface in a V-shape, said first keyboard surface and said second keyboard surface rising towards said portion, and
palm rest means of said body angled downwardly and outwardly from said portion of said body for supporting the palms of an operator,
said body including means for elevating said leading edge of said body from a first position to a second position so that said body is positionable in more than one orientation.

20. A computer keyboard as claimed in claim 19, wherein said body, when the leading edge is in the second position, is in a substantially horizontal orientation.

21. A computer keyboard as claimed in claim 19, wherein said body, when the leading edge is in the second position, is in a greater than horizontal orientation.

22. A computer keyboard comprising:
a body having a leading edge closest to the user,
a first keyboard surface of said body,
a second keyboard surface of said body,
a portion of said body dividing said first keyboard surface from said second keyboard surface in a V-shape, said first keyboard surface and said second keyboard surface rising towards said portion, and
a palm resting surface of said body angled downwardly and outwardly with respect to said portion of said body for supporting the palms of an operator,
said body including means for elevating said leading edge of said body from a first position to a second position.

23. A computer keyboard as claimed in claim 22, wherein said body, when the leading edge is in the second position, is in a substantially horizontal orientation.

24. A computer keyboard as claimed in claim 22, wherein said body, when the leading edge is in the second position, is in a greater than horizontal orientation.

25. A computer keyboard comprising:
a body having a leading edge closest to the user,
a first keyboard surface of said body,
a second keyboard surface of said body,
a portion of said body dividing said first keyboard surface from said second keyboard surface in a V-shape, said first keyboard surface and said second keyboard surface rising towards said portion, and
a palm resting surface of said body angled downwardly and outwardly with respect to said portion of said body for supporting the palms of an operator as the fingers of the operator overlie the keys on said first keyboard surface and said second keyboard surface,
said body including means for elevating said leading edge of said body from a first position to a second position so as to change the orientation of said first and second keyboard surfaces.

26. A computer keyboard as claimed in claim 25, wherein said body, when the leading edge is in the second position, is in a substantially horizontal orientation.

27. A computer keyboard as claimed in claim 25, wherein said body, when the leading edge is in the second position, is in a greater than horizontal orientation.

* * * * *